US006777980B2

(12) United States Patent
Young et al.

(10) Patent No.: US 6,777,980 B2
(45) Date of Patent: Aug. 17, 2004

(54) DOUBLE DATA RATE FLIP-FLOP

(75) Inventors: Steven P. Young, Boulder, CO (US);
Suresh M. Menon, Sunnyvale, CA (US); Ketan Sodha, Fremont, CA (US); Richard A. Carberry, Los Gatos, CA (US); Joseph H. Hassoun, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 36 days.

(21) Appl. No.: 10/342,574

(22) Filed: Jan. 15, 2003

(65) Prior Publication Data

US 2003/0112032 A1 Jun. 19, 2003

Related U.S. Application Data

(62) Division of application No. 09/759,432, filed on Jan. 12, 2001, now Pat. No. 6,525,565.

(51) Int. Cl.[7] .............................................. H03K 19/173
(52) U.S. Cl. .............................. 326/41; 326/37; 326/46
(58) Field of Search ............................. 326/37, 38–40, 326/41, 46

(56) References Cited

U.S. PATENT DOCUMENTS

| 5,844,844 | A  |   | 12/1998 | Bauer et al.   |        |
|-----------|----|---|---------|----------------|--------|
| 6,020,760 | A  |   | 2/2000  | Sample et al.  |        |
| 6,060,928 | A  |   | 5/2000  | Jun et al.     |        |
| 6,472,904 | B2 | * | 10/2002 | Andrews et al. | 326/38 |
| 6,686,769 | B1 | * | 2/2004  | Nguyen et al.  | 326/46 |

FOREIGN PATENT DOCUMENTS

| EP | 0 312 259 B1 | 4/1989 |
|----|--------------|--------|
| GB | 2 339 502 A  | 1/2000 |

OTHER PUBLICATIONS

U.S. patent application Ser. No. 09/684,540, Young et al., filed Oct. 6, 2000.

* cited by examiner

Primary Examiner—Anh Q. Tran
(74) Attorney, Agent, or Firm—Edel M. Young

(57) ABSTRACT

Method and apparatus for doubling the throughput rate of data transmission on a logic path comprising providing two latches that alternately receive successive bits of the data stream to be transmitted and a multiplexer having data transmission paths that are alternately clocked by two separate clocks, which clocks are substantially 180 degrees out of phase.

8 Claims, 7 Drawing Sheets

DOUBLE DATA RATE FLIP-FLOP

FIELD OF THE INVENTION

The present invention relates to integrated circuit input/output circuitry, and more particularly to a method and apparatus for doubling the rate at which registered data can be input to and output from an integrated circuit device.

BACKGROUND

In many digital logic applications it is desirable to present data at the input/output ports of an integrated circuit device (IC) employing as high a data rate as the IC device can tolerate. This high data throughput rate is important in applications such as network communications, cell phone base stations, and others.

Different approaches have been used in the past to maximize data input and output rates. Principal among these has been to speed up the clock rate at which a device is capable of operating. These approaches have focused on improving the process or manufacturing tolerances of the materials and tools used to make IC devices. However, whatever process or device improvements are made, for any given technology there is a maximum clock rate which sets the data rate.

Reprogrammable logic devices, such as field programmable gate arrays ("FPGA"), are commonly used in all types of digital logic applications. Consequently, FPGAs are used in many applications that require high data throughput. The data throughput rate of an FPGA, as with other ICs is also limited by its maximum clock rate.

FPGAs typically include an array of logic function generators or configurable logic elements, input/output ports, and a matrix of interconnect lines. The matrix of interconnect lines generally surrounds the configurable logic elements and connects logic data signals between the configurable logic elements and between the configurable logic elements and the input/output ports. FPGAs are configured by programming memory elements, such as static RAM cells, anti-fuses, EPROM cells, and EEPROM cells, which control configuration of the device. Depending on the programming of the memory elements, the configurable logic elements will perform different logic functions and be connected to each other and to the input/output ports in a variety of ways. In general, FPGA's also provide programmable memory cells to configure other features on the IC. For instance, the routing of clock signals and use of multiple clock nets on an FPGA is often programmably selectable by the user.

It is desirable then to implement a logic circuit design which, regardless of the limitations of the process used to manufacture an integrated circuit device, is capable of increasing the rate of data throughput at the device output for any given manufacturing process. It is further desirable to incorporate such a logic circuit design into an FPGA to capitalize on the throughput capabilities of the logic circuit and to provide programmable features to the logic circuit design that cannot be provided in a non-configurable device.

SUMMARY OF THE INVENTION

In accordance with the present invention, a logic circuit design is disclosed that is capable of doubling the data throughput rate at the input/output port of an integrated circuit device for any given clock signal rate. This circuit may also be useful for intra-device communications. When the incorporated into an FPGA, the clock and data source used with the logic circuit may be programmably selectable. In a first aspect of the invention, a double data rate flip-flop comprised of two master latches and a multiplexer containing a slave latch is disclosed. Each master latch receives separate data signals and a clock signal that is substantially 180 degrees out of phase with the clock signal received by the other master latch. The output signal of each master latch is sent to the inputs of the multiplexer. The multiplexer also receives two clock signals 180 degrees out of phase with each other causing the multiplexer to alternate applying its inputs to its output and the slave latch synchronously with the clock signals. In a second separate aspect of the invention, the double data rate flip-flop circuitry can be optionally provided for an input path, an output path, and a tri-state enable path at a device input/output port. In a third separate aspect of the invention, the double data rate flip-flop circuitry can be programmably selected to operate as a double data rate flip-flop, a normal flip-flop, a latch, or an unregistered path. In a fourth separate aspect of the invention, when incorporated in an FPGA the clock source for the double data rate flip-flop can be programmably selected between a single clock and its inversion or two separate clocks synchronized to operate 180 degrees out of phase with each other, and the data source for the double data rate flip-flop may be programmably selected.

DETAILED DESCRIPTION

Figure 1:
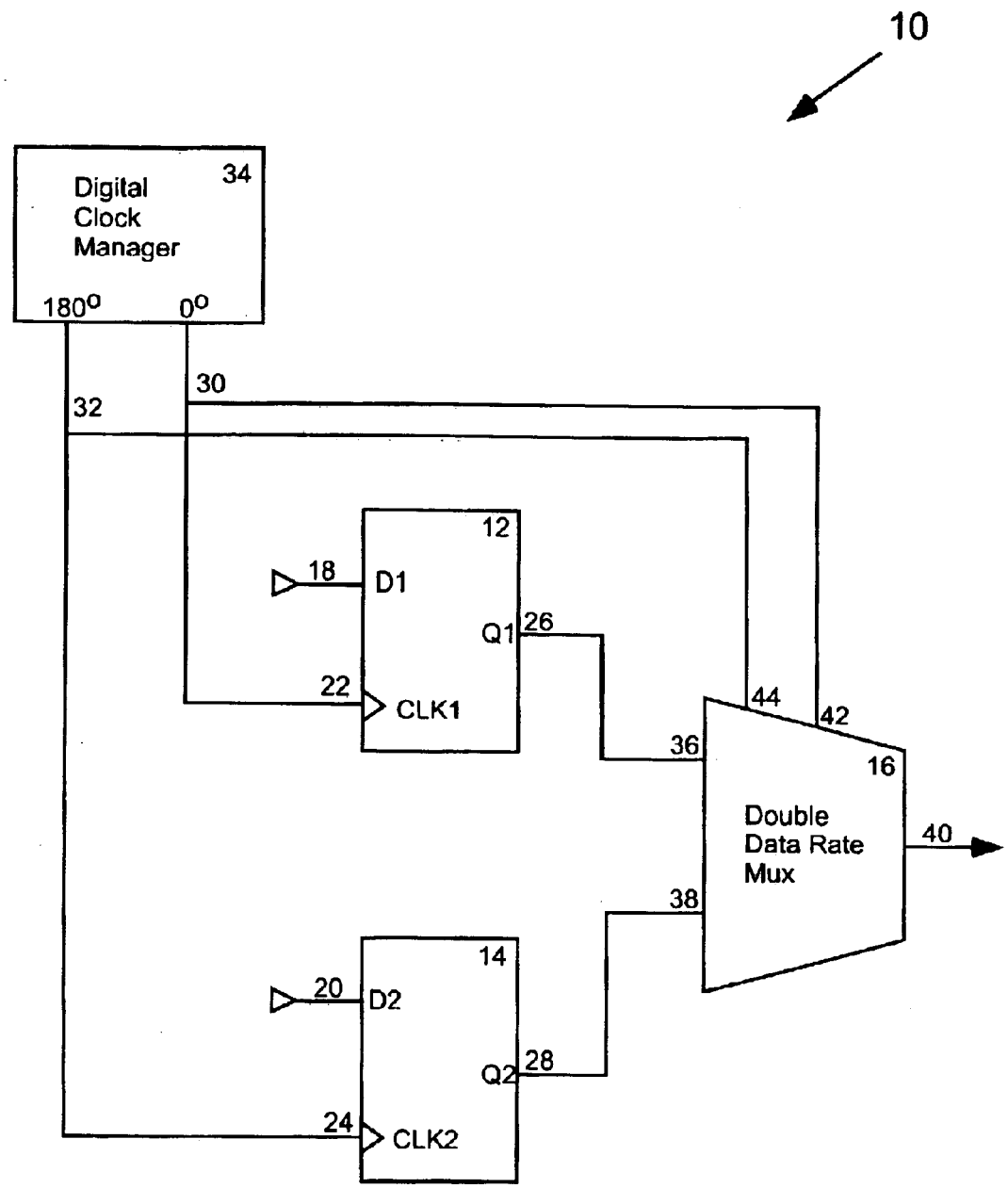
FIG. 1 is block diagram showing a double data rate flip-flop of one embodiment of the invention.

FIG. 1 is a block diagram showing a double data rate flip-flop 10 of one embodiment of the invention. The structure 10 is part of a larger integrated circuit device, such as a field programmable gate array. This circuitry is presently incorporated in the soon to be released Virtex II FPGA from Xilinx, Inc. However, the double data rate flip-flop is useful for any integrated circuit device type employed in high speed data throughput applications.

Traditionally, a flip-flop is comprised of a single master latch and slave latch and control circuitry for clocking data into the latches. The structures employed to create the double data rate flip-flop 10 include two master latches 12, 14 and a double data rate multiplexer 16 including a slave latch at its output. Each register 12, 14 includes a data input pin 18, 20, a clock pin 22, 24, and an output pin 26, 28. The data input pins 18, 20 are presumed to be connected to different sources of data coming from the remainder of the integrated circuit device. Typically, the two master latches will alternately receive successive bits from a data stream that is to be sent elsewhere on or off of the integrated circuit device. In the case of an FPGA incorporating this circuitry, the application of the data to the master latch inputs will be accomplished by programming the interconnects appropriately to send the data to the master latch input pins. Typically the inputs would be programmably connected to separate interconnect lines that carry the relevant data stream. The programmable connection may be made using any of several means well known to those of ordinary skill in the programmable logic art. For example, such programmable connections can be made using n-channel pass transistors controlled by static latch memory cells. The master latches may be cross-coupled inverters with a clock controlled access gate or any other suitable clock triggered memory circuit.

The clock pins 22, 24 of the master latches receive clock signals 30, 32 that are substantially 180 degrees out of phase with each other from a clock source 34. It should be appreciated, however, that two clock pins are not necessary. A single clock pin can be substituted which feeds an inverter internal to the flip-flop that serves to create the 180 degree phase shifted clock signal. The preferred FPGA of the present invention, Virtex II, provides the capability of controlling the clock source to the double data rate flip-flop. Specifically, the clock source can be either a single clock and its inverted signal or can be from two separate clocks that are synchronized to run at the same frequency with a 180 degree phase shift between them. The latter approach is advantageous in that a single clock may have uneven rising and falling edges, which can cause clock skew and may adversely affect the double data rate operation. Using two separate clocks that are synchronized to be 180 degrees out of phase with each other avoids this problem because only the rising edges matter, and any difference between rising and falling edges becomes irrelevant. User programmable connections that allow users to select between the different options are described by Young et. al. in U.S. patent application Ser. No. 09/684,540 entitled "Digital Phase Shifter", incorporated herein by reference. Thus, clock signals 30, 32 are substantially 180 degrees out of phase with each other.

The output pin 26 of the first master latch 12 is connected to a logic data input pin 36 of the double data rate multiplexer 16. The output pin 28 of the second master latch 14 is connected to a logic data input pin 38 of the double data rate multiplexer 16. The clock signals 30, 32 are also sent to the double data rate multiplexer where they connect to control input pins 42, 44 and control the transmission of logic data through the double data rate multiplexer when it is operating in double data rate mode. The output pin 40 of the double data rate multiplexer is available to be sent to the output stage of the device or wherever else is appropriate.

In operation, successive bits in a data stream are presented at the inputs 18, 20 to the two master latches. In an FPGA, this may be accomplished by programmably connecting the inputs to two different interconnect lines. These bits are clocked into the master latches on the rising edge of each associated clock signal (this may also occur on the falling edge depending on latch design or programming if a latch that utilizes programmably alterable edge triggering is used). On the rising edge of the first clock signal 30, the output value of the first master latch 26 is passed through the double data rate multiplexer 16. On the rising edge of the second clock signal 32 the output of the second master latch 28 is passed through the double data rate multiplexer 16. It will be appreciated by one of ordinary skill that because the two clock signals are 180 degrees out of phase, twice the data throughput rate is achieved as would be possible with a single clocked register.

Figure 2:
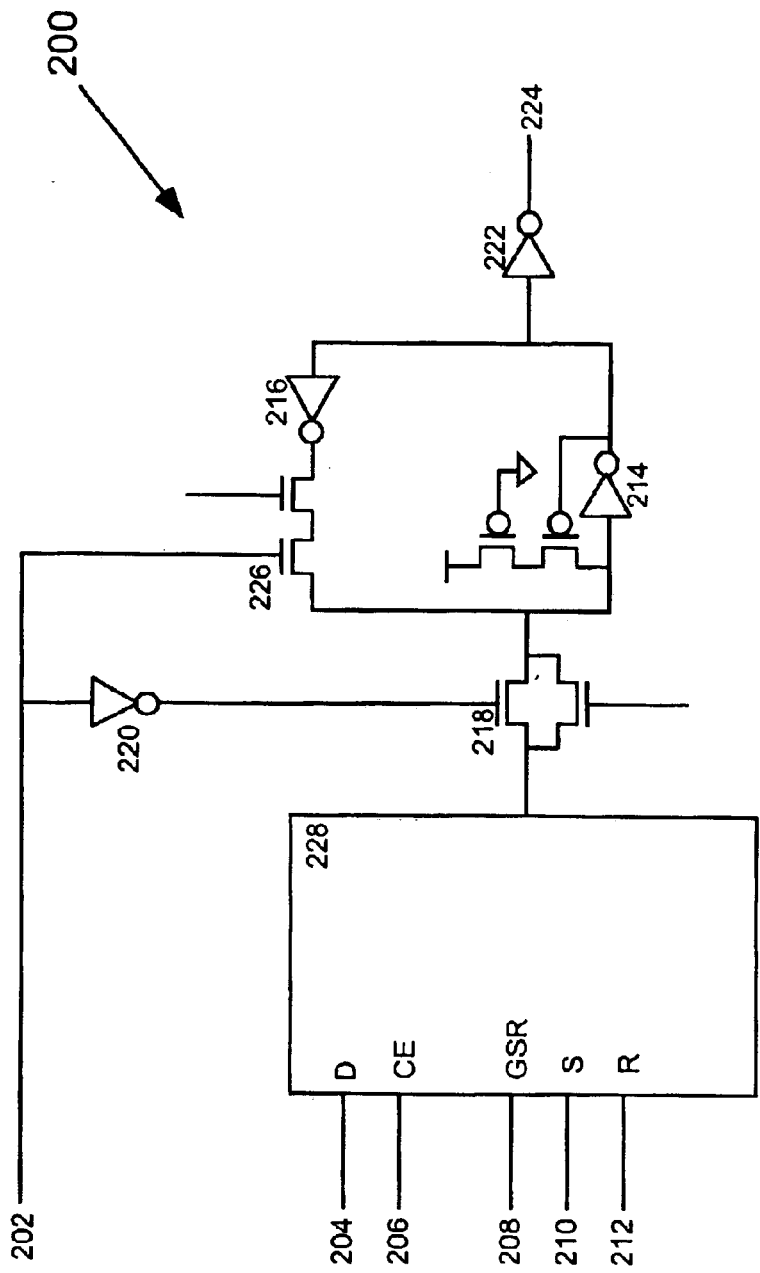
FIG. 2 is a schematic view of the detailed implementation of one embodiment of a master latch of the invention.

FIG. 2 depicts the detailed implementation of a preferred embodiment of the master latch 200 of the present invention. The master latch 200 has a clock input pin 202 (which can receive either of the clock signals 30, 32 depending on whether this is the first or second master latch or the true or complemented version of a single clock signal), a data input pin 204, a clock enable pin 206, a global set and reset pin 208, a set pin 210 and a reset pin 212 signal. The latch further comprises cross-coupled inverters 214, 216 and an access gate 218 made of n-channel pass transistors. During normal operation, the access gate is controlled by an inverter 220 which receives its input from the clock pin 202. Data is presented on the input pin 204 and, during normal operation, is applied to the access gate 218 of the latch. When the clock signal goes low, the inverter 220 inverts that signal causing the access gate 218 to transmit data from the input pin 204 into the latch. The first inverter 214 of the latch inverts the data and sends it to a second inverter 222 that makes the true value of the data available at the latch output 224. Simultaneously, the first inverter 214 sends the data to the feedback inverter 216. Between the output of the feedback inverter 216 and the input of the first inverter 214 is an n-channel pass transistor 226 controlled by the clock. When the clock signal transitions high, the pass transistor 226 begins transmitting the output from feedback inverter 216 back to the input of the first inverter 214 thereby ensuring the data value will be maintained by the latch. Standard global set/reset and individual set and reset circuitry may be provided as is well known to one of ordinary skill in the art and depicted as block 228.

Figure 3:
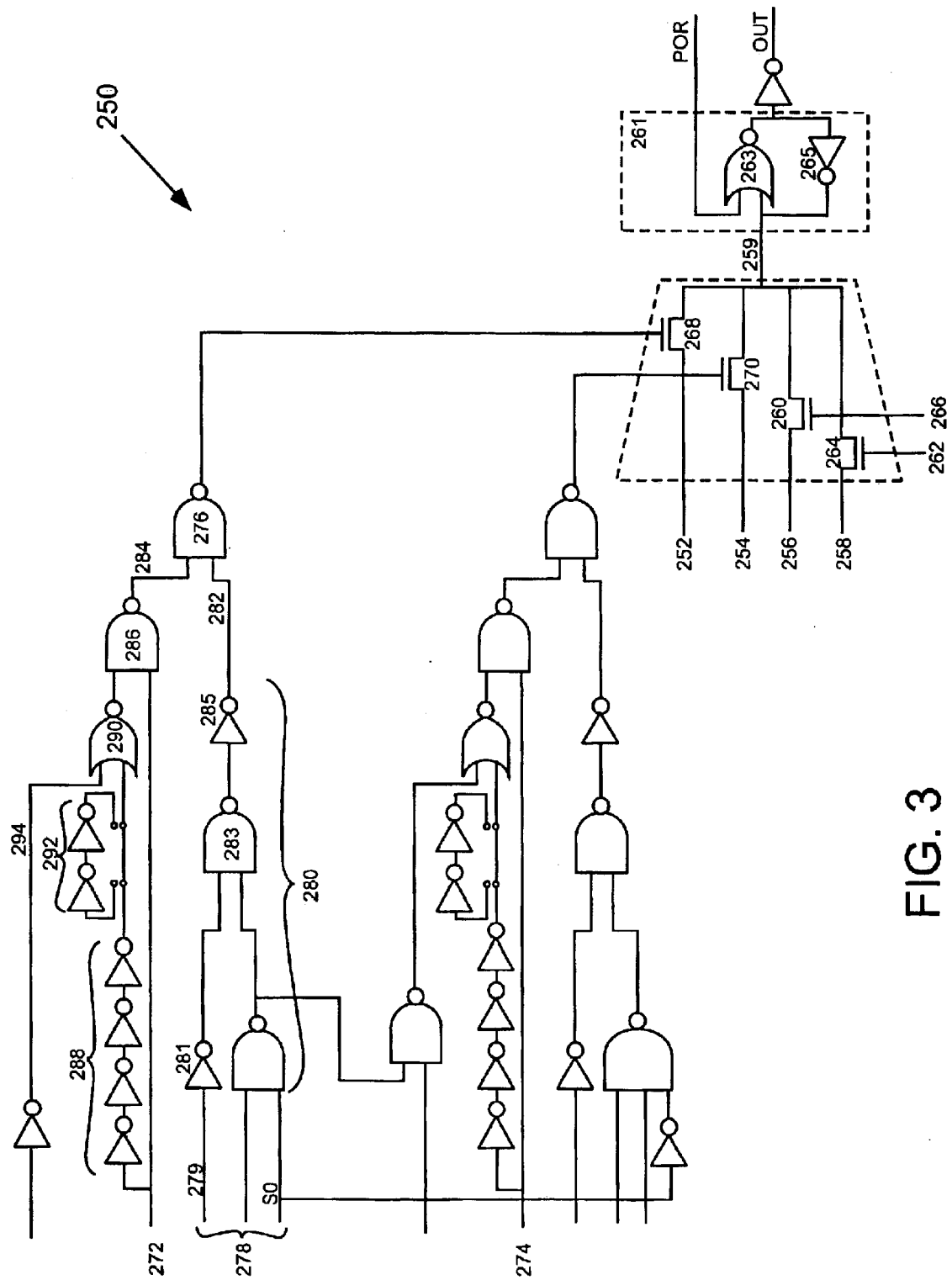
FIG. 3 is a schematic view of the detailed implementation of one embodiment of a double data rate multiplexer of the invention.

FIG. 3 discloses a preferred embodiment of a double data rate multiplexer 250 of the invention. In the multiplexer 250 of FIG. 3, there are four data transmission paths 252, 254, 256, 258. Each of these paths has an input pin and terminates at a common output node 259. The node feeds to a slave latch 261 comprised of cross-coupled inverters. As shown in FIG. 3, slave latch 261 includes a NOR gate 263 cross coupled with an inverter 265. Inverter 265 is made weak (a weak keeper) so that a signal on multiplexer output 259 can easily overpower the output of inverter 265, yet when no signal on output 259 is provided, latch 261 retains its value. Slave latch 261 also includes a power-on-reset feature enabled by power-on-reset signal POR. A high POR signal holds the double data rate output signal OUT high until the device is powered up and POR is brought low.

In another embodiment, not shown, when any of transistors 268, 270, 260, or 264 is on, a pass transistor at the output of inverter 265 disconnects the output of inverter 265 from line 259 so no contention occurs.

Although it was decided to include a slave latch in the multiplexer, the timing sequence and data throughput rate of a particular application may be such that a slave latch is unnecessary and it can be eliminated.

The third data transmission path 256 contains a single n-channel pass transistor 260. The gate of the pass transistor 260 is controlled by signal 266 which determines the conductive state of the pass transistor. The fourth data transmission path 258 also contains a single n-channel pass transistor 262, whose gate is controlled by a control signal 262 that determines the conductive state of the pass transistor. The third and fourth paths are provided to allow the multiplexer to operate in an unregistered feed through mode. In an FPGA, control signals 262 and 266 may be provided by configuration memory cells, thus placing the double data rate flip-flop into the unregistered feed through mode.

The first and second data transmission paths 252, 254 are each controlled by a single n-channel pass transistor 268, 270 whose transmission is controlled by one of two clock signals 272, 274 that are 180 degrees out of phase. Because each of these transistors is controlled the same way, we will describe the control of only one of these transistors in detail. The n-channel pass transistor 268 of the first data path is connected to the output of a two-input NAND gate 276. One input 282 of NAND gate 276 is controlled by signals 278 that are logically combined 280 to create the input signal. The other input 284 to NAND gate 276 is ultimately controlled by the first clock signal 272. Prior to arriving at the NAND gate input 284, the clock signal travels through two parallel paths. Each path terminates as an input to a second NAND gate 286. The output of second NAND gate 286 is coupled to the second input 284 of the first NAND gate. One input to the second NAND gate 286 comes directly from the first clock signal 272. The second input to the second NAND gate is a delayed version of the first clock signal. That delayed version of the first clock signal travels through four delay inverters 288 and a two input NOR gate 290. Additional delay inverters 292 may optionally be added into this path as desired.

When the multiplexer is to be utilized in double data rate mode, successive bits of the data for transmission will be alternately presented on the two input pins 252, 254 from the master latches. Data will be passed through the first or second data path only when the associated pass transistor is conducting. The control signals for the third and fourth paths 256, 258 will be set so that no other path is conducting, to avoid any conflict at the common node.

Figure 4:
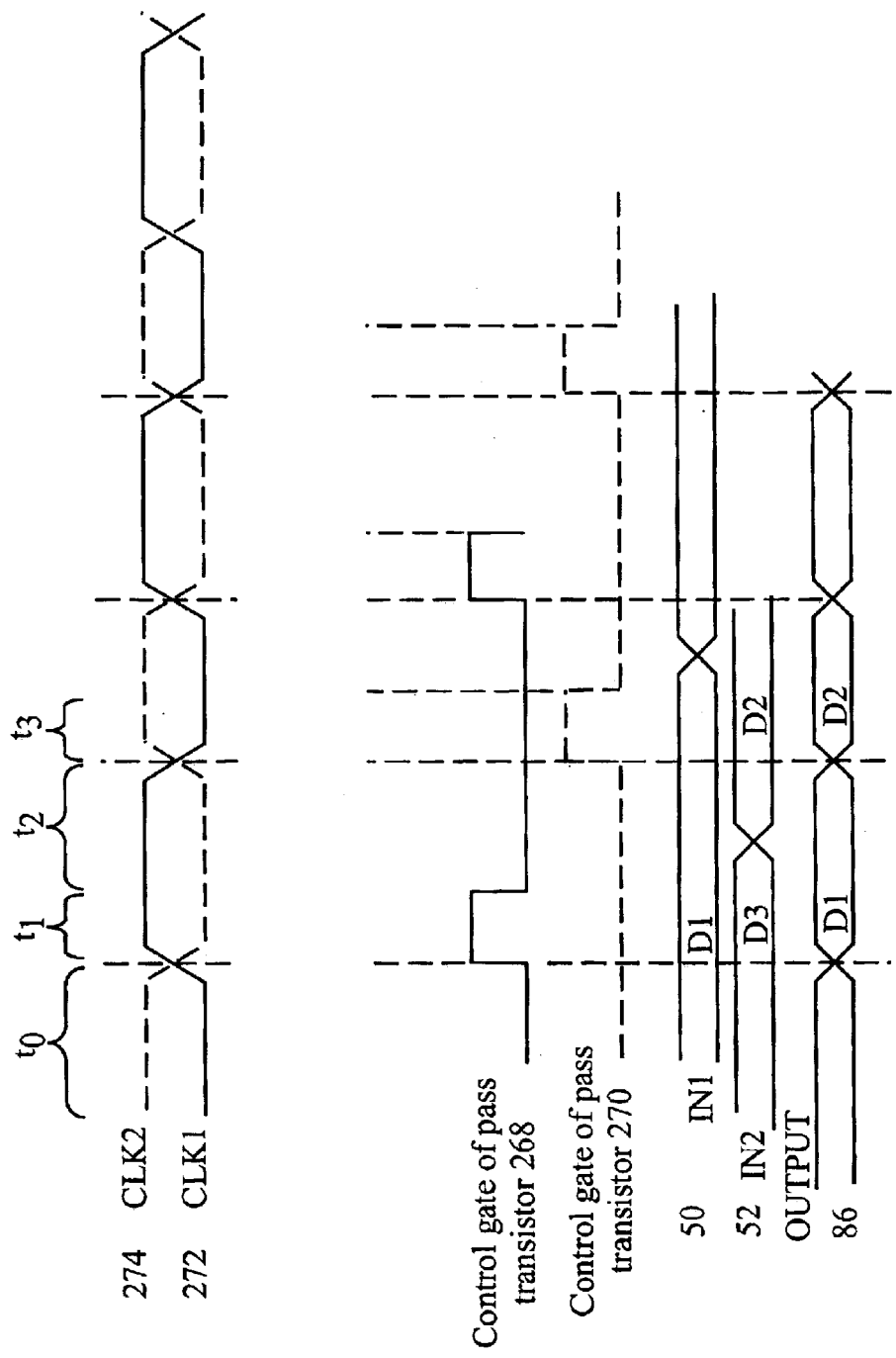
FIG. 4 is a timing diagram showing the operation of the circuitry depicted in FIG. 3.

We refer now to FIG. 4, which is a timing diagram demonstrating double data rate operation in FIG. 3. In operation, the two input NOR gate 290 receives a logic low on one of its inputs 294 and therefore acts as an inverter of the delayed version of the clock signal which it receives on its other input.

The first clock signal 272 is low for a period of time $t_0$ long enough for the low signal to propagate through the delay inverters 288 and NOR gate 290 so that the two inputs to the second NAND gate 286 are a low and a high signal. This causes the output of the second NAND gate 286 to be high. The control signals 278 will also be appropriately set so that the first NAND gate 276 receives two high inputs and its output is low turning the pass transistor 268 in the first data path 252 off. When the first clock signal 272 transitions to high (beginning of period $t_1$), the output of the second NAND gate 286 goes low because one input is high and the clock transition to the second input is delayed, leaving the second input signal temporarily high. The second NAND gate 286 output remains low during the period of time $t_1$ that the high clock transition propagates through the delay inverters 288 and the NOR gate 290. The low on one input 284 of the first NAND gate 276 causes the output of the first NAND gate to go high, turning the pass transistor 268 and the first data path on, and causing the data signal on input pin 252 to be transmitted to the common output node 259 and written into slave latch 261. After the first clock signal high transition propagates through the four delay inverters 288 and the NOR gate 290 (beginning of $t_2$), causing five inversions of the signal, the second input to the second NAND gate 286 transitions to a low input. This once again causes the output of the second NAND gate 286 to go high. When the second NAND gate output goes high, this causes the output of the first NAND gate 276 to go low, turning the pass transistor 268 in the first data path off again.

Pass transistor 270 in the second data path 254 is controlled by a second set of essentially identical circuitry as just described for the first data path, except that the second path is controlled by the second clock signal 274, which is substantially 180 degrees out of phase with the first clock signal. Thus, in operation, pass transistor 270 in the second data path 254 will conduct for a window of time $t_3$ delayed by 180 degrees from the first path. It will be appreciated by one of ordinary skill that the delay inverters and control circuitry associated with the clock signal controlled paths cause a window of time during which data will be transmitted on a given data path and prevent contention at the common output node where the data is written into the latch.

In addition to a double data rate mode, multiplexer 250 has two other modes of operation. As described above, it can operate as an unregistered signal connector. Likewise, multiplexer 250 can be programmed in a latch mode where the data from one of the two master latches will be asynchronously passed through to the multiplexer slave latch. The multiplexer operates in latch mode as follows. The third and fourth data transmission paths 256, 258 will be turned off. One of the first two data transmission paths 252, 254 will also be turned off. Assuming the second data path 254 is to be turned off, the first data path 252 will be turned on by setting control signal 279 high. The high signal is inverted four times by inverter 281, NAND gate 283, inverter 285, and NAND gate 276. Because the signal is inverted four times, pass transistor 268 receives a high signal on its control gate, turning path 252 on, which causes the multiplexer to asynchronously pass the data from the master latch to slave latch 261.

Figure 5:
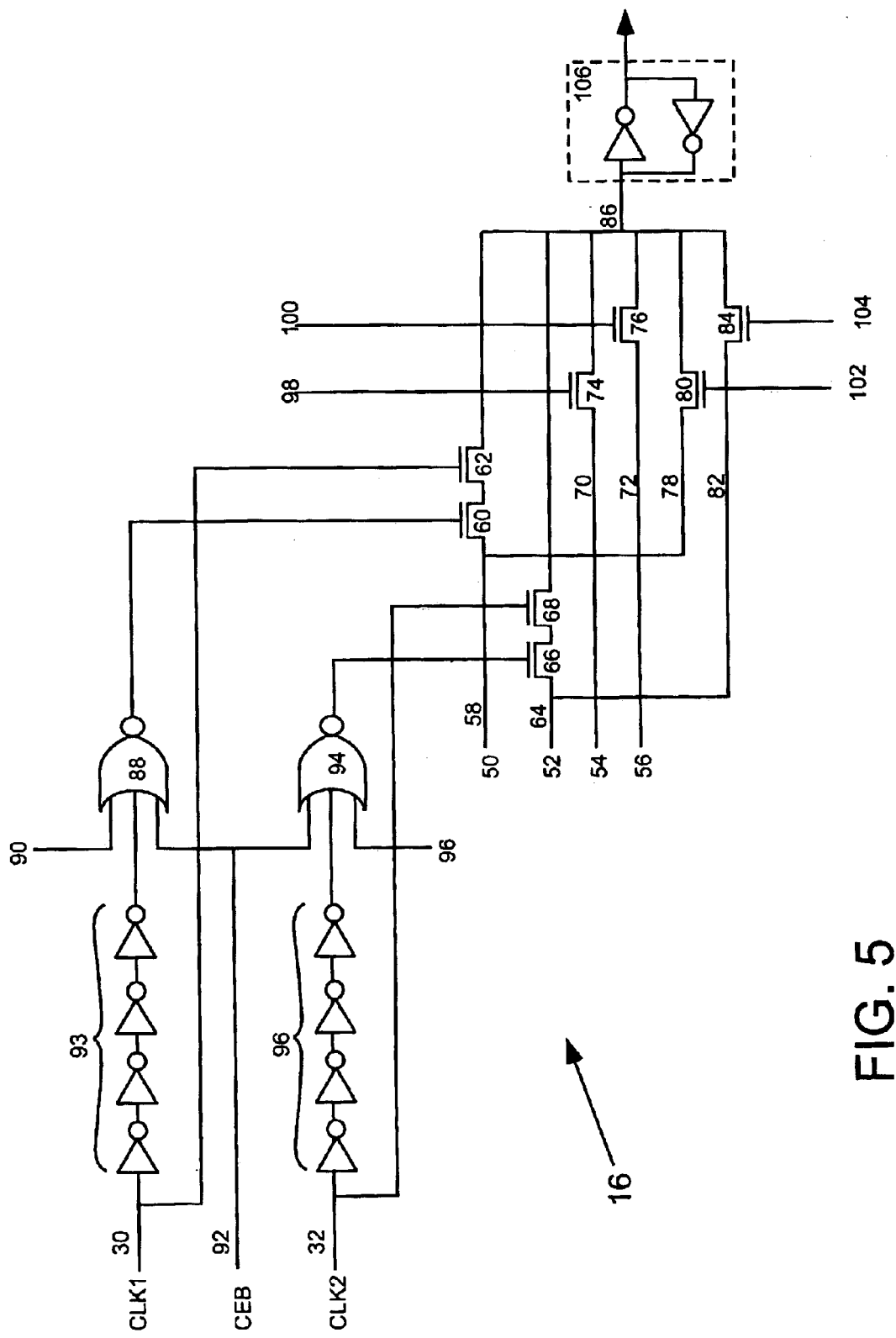
FIG. 5 is a schematic view of the detailed implementation of one embodiment of a double data rate multiplexer of the invention.

FIG. 5 depicts the detailed implementation of another preferred embodiment of the double data rate multiplexer 16 of the invention. The multiplexer has four logic data input pins 50, 52, 54, 56. Each input pin is connected to at least one logic data transmission path. The first data path 58 has two n-channel pass transistors 60, 62 in series that control transmission of data on that path. Likewise, the second data path 64 also has two n-channel pass transistors 66, 68 that control transmission of data on that path. The third 70 and fourth 72 data paths each have single n-channel pass transistors 74, 76 for controlling transmission of data. In addition, the top-most data input pin 50 is connected to a fifth logic data path 78 controlled by a single n-channel pass transistor 80. The second data input pin 52 is also connected to a sixth logic data path 82 controlled by a single pass transistor 84. The pass transistors could also be implemented using p-channel devices. Each of the logic data paths terminate in a common output node 86.

The control gate of the first pass transistor 60 of the first data path 58 is connected to the output of a three-input NOR gate 88. One input of the NOR gate 88 comes from a control signal 90. The second input comes from an active low clock enable signal 92. The third input comes from the first clock signal 30 (see FIG. 1) after it has gone through four inverters 93 that delay the propagation of the clock signal to the NOR gate. The control gate of the second pass transistor 62 in the first logic data path 58 is connected directly to the first clock signal 30. The control gate of the first pass transistor 66 in the second logic data path 64 is connected to the output of a three input NOR gate 94. The three input NOR gate 94 receives a control signal 96 and the clock enable signal 92 as two of its inputs. The third input of the three input NOR gate 94 comes from the second clock signal 32 after it has gone through four inverters 96 that delay the propagation of the clock signal to the NOR gate. The second pass transistor 68 in the second data path 64 is connected directly to the second clock signal 32. The third data path 70 has a single pass transistor 74 whose control gate is connected to a select signal 98. The fourth data path 72 has a single pass transistor 76 whose control gate is connected to a second select signal 100. The fifth logic data path 78, which is parallel to the first logic data path 58, has a single pass transistor 80 whose control gate is connected to a third select signal 102. The sixth data path 82, which is parallel to the second logic data path 64, has a pass transistor 84 whose control gate is connected to a fourth select signal 104. The common output node 86 is connected to the input of a static latch 106 comprised of cross coupled inverters. The output of the first inverter of the static latch 106 is the output of the double data rate multiplexer.

When the multiplexer is to be utilized in double data rate mode, successive bits of the data for transmission will be alternately presented on the two input pins 50,52. Data will be passed through the first or second data path 58, 64 only when both pass transistors associated with that path are conducting. The control signals for the remaining paths will be set so that no other path is conducting in order to avoid any conflict at the common node. Additionally, the NOR gate control signals 90, 96 and the clock enable signal 92 will be low, causing each NOR gate 88, 94 to act as an inverter of the associated clock signal input to it.

Figure 6:
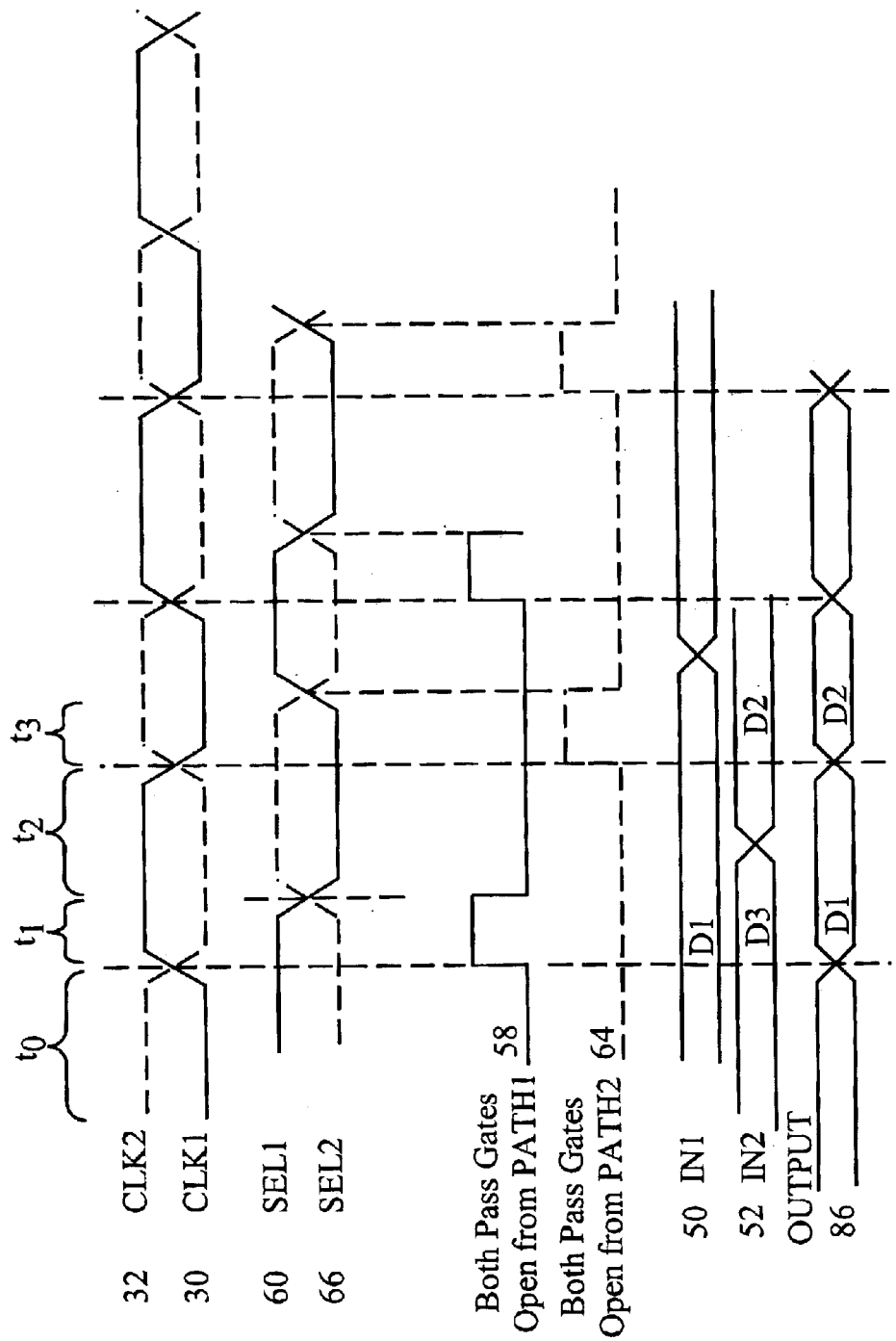
FIG. 6 is a timing diagram showing the operation of the circuitry depicted in FIG. 5.

We refer now to both FIG. 5 and FIG. 6. FIG. 6 is a timing diagram of the circuitry of FIG. 5 when it is operating in double data rate mode. The following sequence of signals will produce a double data rate. For a first time period $t_0$ the first clock signal 30 will be low. The low signal propagates through the four delay inverters 93 to the three-input NOR gate 88, whose output then becomes a logic high, causing the first pass transistor 60 to conduct. When the first clock signal 30 transitions to a high value (at the beginning of time period $t_1$), that high value immediately propagates to the control gate of the second pass transistor 62, which then conducts. With both pass transistors 60, 62 conducting, path 58 conducts from the input pin 50 to the static latch 106 and the logic data value on input pin 50 is written into static latch 106. After the rising edge of the first clock signal 30 propagates through the four delay inverters 93 (at the end of time period $t_1$), it is inverted by NOR gate 88, putting a logic low value on the control gate of the first pass transistor 60. This causes the pass device to stop conducting, and the first logic data path 58 stops conducting from input pin 50 to static latch 106. The first clock signal will remain high for the time period $t_1+t_2$.

Because the second clock signal 32 is substantially 180 degrees out of phase with the first clock signal, the second clock signal transitions low when the first clock signal transitions high (at the beginning of period $t_1$). This low transition turns off the second pass transistor 68 of the second data path 64. After the low transition of clock signal 32 propagates through the four delay inverters 96 to NOR gate 94, NOR gate 94 inverts the low signal to a high, which causes the first pass transistor 66 of the second logic data transmission path 64 to conduct. When the second clock signal 32 transitions to a high value (at the beginning of period $t_3$), the second pass transistor 68 of the second logic data path 64 also begins to conduct, and the logic data value on the second input pin 52 is passed through to the common output node 86 and written into the static latch 106.

As will be appreciated by one of ordinary skill in the art, the purpose behind this timing sequence created by the delay inverters 93, 96 and NOR gates 88, 94 is to ensure that there is no contention between the first and second logic data transmission paths at the common output node. Care must be taken so that the window of time during which the data path conducts is long enough to write the value into static latch 106. With reference again to FIG. 1 and FIG. 2, it will be appreciated that the output signal from the first master latch is latched and available at the first input pin of multiplexer 16 when the clock signal transitions. As can be seen in the timing diagrams of FIGS. 4 and 6, this data signal will then be written into the slave latch of multiplexer 16 when the first clock signal transitions high.

It should also be appreciated that the four logic data paths 70, 72, 78, 82 having single switches controlled by single control signals are provided to allow the double data rate multiplexer to act as a traditional four to one multiplexer. Any number of paths with single switch control may be provided, depending upon the desired functionality of the multiplexer. Additionally, appropriate setting of the control signals will allow multiplexer 16 to operate in latch mode in a similar manner as described above with respect to the multiplexer of FIG. 3.

Figure 7:
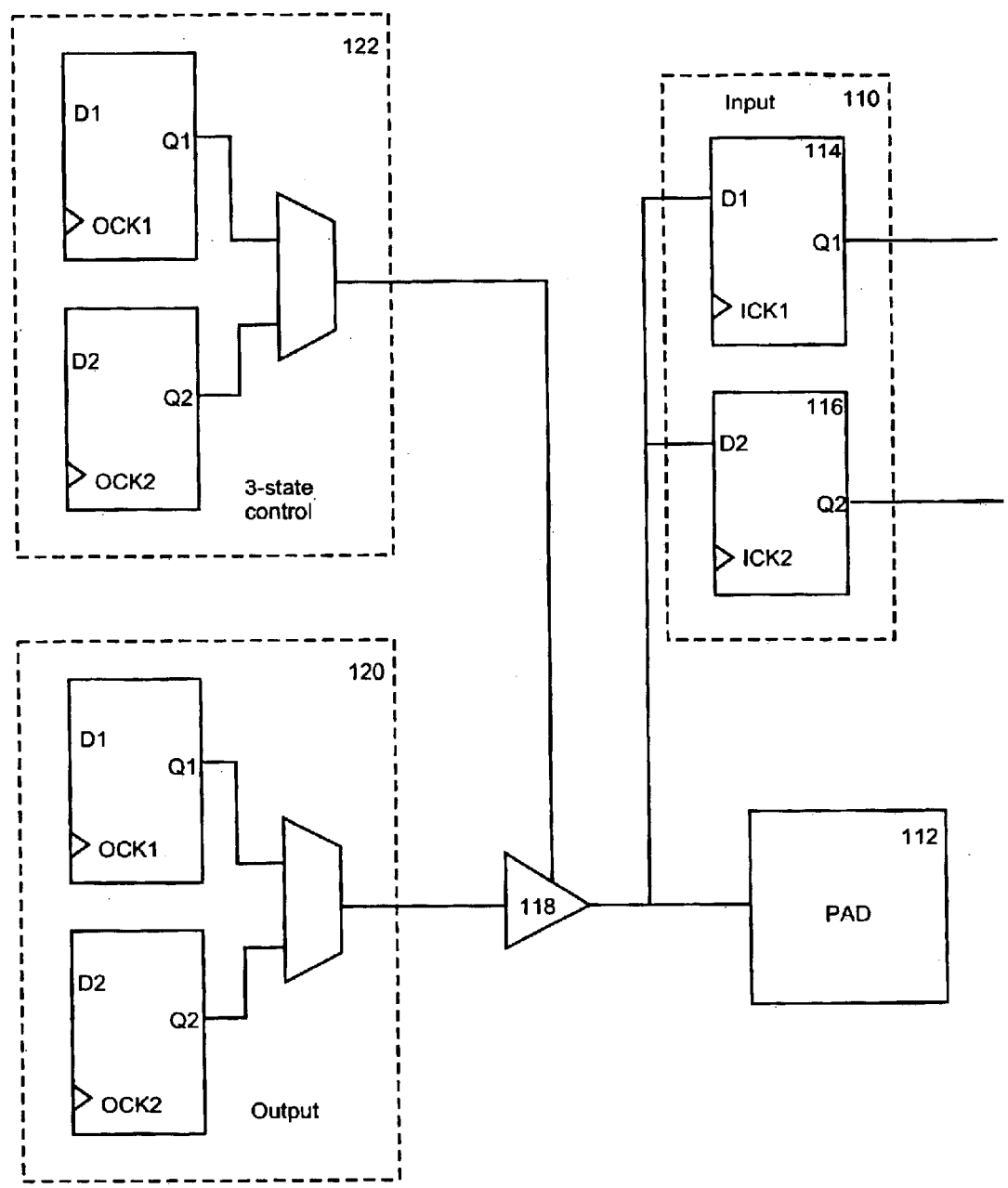
FIG. 7 is a block diagram depicting one embodiment of the invention in which multiple double data rate flip-flops are provided at the input/output port of an integrated circuit device.

FIG. 7 illustrates a preferred embodiment of the invention in which double data rate capabilities are provided for input, output, and to the tri-state control of an input/output block. FIG. 7 shows an input/output block 110 of a field programmable gate array (not shown). This block includes a pad 112 that is connected to the exterior of the IC device. Connected to receive logic data from the pad 112 is a pair of input latches 114, 116. The input latches 114, 116 are clocked by two separate clocks that are 180 degrees out of phase (not shown). The output path from the FPGA logic to the pad is controlled by a tri-state buffer 118. The data input of the tri-state buffer 118 comes from the output of a double data rate flip-flop 120. The control signal for the tri-state buffer comes from a second double data rate flip-flop 122.

Each of the double data rate flip-flops 120, 122 generally operate as described above with respect to FIG. 1. That is, they are capable of outputting data on their output pins at twice the standard clock rate of the FPGA device in which they are included. Thus, the user of the FPGA device may program the device to utilize a double data rate for output of logic data. A double data rate flip-flop also supplies the control signal for the tri-state buffer. This is necessary to ensure that the tri-state buffer is active or inactive as appropriate when the output port is being used in double data rate mode. If the tri-state control signal were to come from a source operated at the clock rate, data could be lost or contentions might result. For example, assume the tri-state is connected to a common bus signal line off of the device. The bus signal line operates at the double data rate it receives from the tri-state buffer connected to the double data rate flip-flop. There will be periods of time when other outputs will drive the common bus signal line. Thus, the tri-state buffer should only be active for some periods of time but not others. If valid data is changing at the tri-state input in half clock period cycles, but the tri-state control is only changing in full clock period cycles, conflicts may occur and data may be lost.

It is also possible to use the I/O port circuitry in a clock forwarding or mirroring function. In this mode of operation, one input to one of the master latches will be programmably tied high. The input to the remaining master latch will be programmably tied low. During double data rate operation, the double data rate flip-flop will toggle between high and low, at the double data rate. This signal can be sent off chip and is a low skew clock that mirrors the FPGA clock. Multiple outputs on the FPGA could be programmed in this fashion to create multiple clock sources for a given design.

Finally, the dual input latches 114, 116 are capable of receiving a double data rate input signal from off the device. There is no multiplexer provided on the input path from pad 112 to the input latches 114, 116 because it is presumed that the user's design will present the data to the pad at the desired data rate.

The above description of the invention is intended to be illustrative and not limiting. Other embodiments of this invention will be obvious to those skilled in the art in view of the above disclosure.

What is claimed is:

1. In an FPGA having programmable interconnect and programmable clock routing, an input/output port comprising:

a double data rate flip-flop comprising two master latches having outputs coupled to a multiplexer comprising a slave latch, the master latches and multiplexer being controlled by two clock signals substantially 180 degrees out of phase with each other such that data is alternately written from one of the two master latches into the slave latch; and a tri-state driver having an input connected to the slave latch and an output for driving signals off the integrated circuit device.

2. The input/output port of claim 1, wherein one of the clock signals is an inversion of the other clock signal.

3. The input/output port of claim 1, wherein each clock signal is separately generated.

4. The input/output port of claim 1, wherein the tri-state driver having a tri-state input connected to a second double data rate flip-flop comprising two master latches having outputs coupled to a multiplexer comprising a slave latch, the master latches and multiplexer being controlled by two clock signals substantially 180 degrees out of phase with each other such that data is alternately written from one of the two master latches into the slave latch.

5. The input/output port of claim 1 further comprising first and second input latches, the first and second input latches being clocked by separate clock signals substantially 180 degrees out of phase with each other and the first and second input latches connected to receive logic data input signals from off of the integrated circuit device.

6. The input/output port of claim 1 wherein the master latches have inputs that are programmable connectable to a constant logic high and a constant logic low such that the input/output port can output a mirror of the clock edges of the two clock signals.

7. The input/output port of claim 1 wherein the double data rate flip-flop can be configured to operate as a simple flip-flop.

8. The input/output port of claim 1 wherein the double data rate flip-flop can be configured to operate as a latch.

* * * * *